Patented Jan. 2, 1940

2,185,871

UNITED STATES PATENT OFFICE 2,185,871

DYESTUFF PASTES OF DYESTUFFS OF THE DIBENZANTHRONE CLASS AND PROCESS FOR PREPARING THEM

Otto Stallmann, Bridgeton, N. J., assignor to E. I. du Pont de Nemours & Company, Wilmington, Del., a corporation of Delaware No Drawing. Application January 20, 1939, Serial No. 251,963

10 Claims. (Cl. 260—355)

This invention relates to the preparation of new dyestuff pastes and powders of the vat colors of the dibenzanthrone class. The invention relates more particularly to the preparation of dyestuff pastes and powders of the alkoxy derivatives of Bz-2,Bz-2'-dihydroxydibenzanthrone in which the dye is in a physical form which makes it particularly suitable for the application to fibers by any of the known application methods.

Because of the several ways in which dyestuffs, and particularly vat dyestuffs, are applied to fibers, such as by ordinary vat dyeing, printing, machine dyeing and pigment pad reduction dyeing, it has been extremely difficult to prepare a dyestuff paste which without modification could be employed with good results in all of these various application methods. In the ordinary dyeing of vat dyestuffs, where the color is put in solution by means of reducing agents, the physical form of the water-insoluble dyestuff particles prior to reduction is, of course, not as material as when the color is applied to the fiber in the insoluble form, such as by the usual printing process or pigment pad reduction dyeing process. Even in these last two methods of application, it is found that the same degree of fineness in the particle size is not required and, in fact, is not desirable in many cases for, where the dyestuff is put in that extremely fine state of sub-division most desirable for pigment pad reduction dyeing, when used in printing processes, often the penetration is so great that weak appearing prints are obtained unless larger amounts of dyestuffs are employed.

In the printing of anthraquinone vat dyestuffs by the usual methods, the water-insoluble color in finely divided form is dispersed in the printing gum and, after being applied to the fiber, the minute particles are reduced (vatted) to the leuco form in which form they are absorbed by the fiber. In this printing process, relatively strong alkali metal carbonate solutions are employed, and it has been found that many dyestuffs, when in extremely finely divided form, coagulate in the printing gum preparations and cause specky, blotchy or otherwise uneven prints.

Attempts have been made to overcome this coagulation by the addition of printing assistants and with many colors this difficulty is eliminated by the use of a moderate amount of such assistants. With many dyestuffs, however, such as those of the alkoxydibenzanthrone series, when dyestuff pastes or powders of more than 10% color solids content are employed, it has been difficult and in some cases impossible to obtain speck free prints by the usual printing processes. Many colors can be put in suitable crystalline form for printing purposes by acid pasting, or by precipitation from concentrated sulfuric acid solutions by careful dilution of such solutions under controlled conditions. The alkoxydibenzanthrone compounds, however, cannot be successfully subjected to the ordinary acid pasting processes because, by such treatment, the alkyl groups are at least in part hydrolyzed off, resulting in compounds which have impaired fastness properties. Some of these alkoxydibenzanthrone derivatives are hydrolyzed when treated with concentrated sulfuric acid even at low temperatures.

Many vat dyestuffs are put in desirable physical form by precipitation of the leuco compound in the form of the alkali metal salt and reoxidation. The alkoxydibenzanthrone dyestuffs, however, are so soluble in an alkaline hydrosulfite vat that they cannot be precipitated as the alkali metal salt even if the vat is saturated with neutral inorganic salts and cooled below the usual vatting temperatures.

The addition of printing assistants or the usual anti-coagulating agents which have been successfully employed with many vat dye pastes do not prevent the coagulation of the alkoxydibenzanthrone dyestuffs in the printing pastes when the dyestuff paste of a concentration of 10% or more is employed, and a diligent search has, therefore, been made to find a process by which this particular type of dyestuffs can be put in a physical form which will permit of the preparation of more concentrated dye preparations than heretofore employed, and be suitable for use in printing and in dyeing by the various application methods.

It is an object of the invention to prepare dyestuffs of the alkoxydibenzanthrone series in a microcrystalline form from which dyestuff pastes and powders can be produced in relatively high concentration suitable for use in dyeing and printing without the use of assistants, and which do not coagulate in the ordinary printing paste preparations.

A further object of the invention is to prepare microcrystalline dyestuff preparations of the alkoxydibenzanthrone series, which give strong and full shades when employed in the pigment pad reduction dyeing process, yet are capable without alteration of being used in the ordinary printing gum formula without coagulation of the dye particles, and without the use of printing assistants.

Other advantages of the invention, such as increased economy in manufacturing the dye pastes and powders of this series by the reduction in the necessary volume of the dyestuff masses handled and, therefore, an increased volume output of dye per unit of equipment; the saving in cost in the preparation of printing pastes by elimination of a large amount or all of the printing assistants heretofore employed, and the fact that only one type of color need be stocked by the dyer for the several uses to which it may be put will be apparent to those skilled in the art.

I have found that the stable reduction derivatives of the vat colors of the Bz-2,Bz-2'-alkoxydibenzanthrone series, more particularly described in co-pending application Serial No. 186,750 (now U. S. Patent 2,148,042), on reoxidation back to the parent ketonic vat dyestuffs are put in a very fine microcrystalline form that is especially suitable for use in the preparation of printing pastes and in dyeing fabrics by the pigment pad reduction dyeing processes. I have also found that, on reoxidation of these stable reduction derivatives, assistant free dyestuff pastes containing as high as 15% color solids may be produced, which do not coagulate when incorporated in the standard printing gum preparations even in the absence of anti-coagulating agents. The particles of the ketonic dyestuffs obtained by this reoxidation of the stable leuco derivatives are extremely hard rectangular crystals in general of such colloidal size that, when made up as a 1% suspension in water, they show no more than about 5% of settling after 24 hours standing. The size of the particles may be increased, if desired, by precipitating the stable leuco derivative from the vat very slowly or at a higher temperature, in some cases to 90 or 100° C., or by the addition of large amounts of salt to the vat prior to the precipitation. The somewhat coarser crystalline pastes, which may show as much as 15 to 20% settling by the test above mentioned, are preferred in certain instances, such as in the preparation of pastes of extremely high concentrations, or where extremely fluid pastes are desired, and where the pigment pad dyeing value of the paste is of less importance. The particular conditions used to control the particle size depends to some extent upon the particular color being reacted upon and the particular alkali employed in the reduction.

Because of the crystalline form of the color particles, when the color is filtered off from the solution in which it is produced, color press cakes of 25% or higher color solids may be obtained so that further evaporation is unnecessary when the press cake is to be put in powder form by viscous milling with diluents, such as, dextrin, etc.

This new microcrystalline form of the ketonic vat dyestuffs of the alkoxydibenzanthrone series may be prepared by oxidizing back to the ketonic form the isolated stable leuco derivatives of copending application Serial No. 186,750 (now U. S. Patent 2,148,042) in an aqueous suspension, or by adding oxidizing agents directly to the solution in which they were formed without isolation, thereby eliminating the filtration step involved in the isolation of the stable reduction derivatives.

As disclosed in co-pending application Serial No. 186,750, the alkyl ethers of Bz-2,Bz-2'-dihydroxydibenzanthrone, such as Bz-2,Bz-2'-dimethoxydibenzanthrone and its higher homologues (see U. S. Patent 1,531,261) and the alkylation derivatives of Bz-2,Bz-2'-dihydroxydibenzanthrone which may be prepared by the use of alkyl sulfates, alkyl esters of arylsulfonic acids and the alkyl halides, including the dihalides, such as ethylene dibromide, 1,3-dibromopropane 1,3-dichlorobutene, etc., form stable reduction products which are insoluble in alkalies, and which can be regenerated to the common leuco form without the use of reducing agents, and may be oxidized back to the parent ketonic form.

These new stable reduction derivatives of the alkylation products of Bz-2,Bz-2'-dihydroxydibenzanthrone are prepared from the normal leuco compound or its alkali metal salt by heating the same in suspension or solution at temperatures from 55-90° C. while the acid concentration of the suspension or solution is maintained at a pH of from 9 to 12. The preferred method for preparing these stable reduction derivatives is by carefully reducing the alkalinity of an alkaline hydrosulfite vat of the color to a pH value of from 9 to 12 while heating the solution at from 55-90° C. until the precipitation of the olive colored stable leuco derivative in the form of well-defined crystals is completed. The alkalinity of the vat is preferably reduced by the slow addition of a weak acid, such as for example, carbon dioxide, sulfur dioxide or the lower aliphatic acids; by the addition of an acid salt, such as sodium bisulfite, sodium bicarbonate and sodium acid sulfate; or by the addition of salts which are capable of reducing the alkalinity of a caustic solution, such as sodium hydrosulfite, borax, ammonium chloride, aluminum sulfate, etc. The use of sulfur dioxide or sodium bisulfite converts the excess caustic into the alkali metal sulfite, thereby reducing the alkalinity to the required pH value. These stable reduction derivatives may also be prepared by reducing the parent color suspension with sodium hydrosulfite while the alkalinity is maintained at a pH of from 9 to 12 by continued heating of this solution at from 55-90° C., under which condition the dyestuff is apparently simultaneously reduced to the leuco and rearranged to the new olive colored stable reduction derivative. This may be brought about by using less alkali than normally employed in the vatting of the color or a large excess of sodium hydrosulfite, or by adjusting the pH of the solution prior to the addition of the reducing agent, such as, by the use of the buffer salts, weak acids or by the use of a weaker alkali, such as, alkali metal carbonate or ammonia. Where the vatting is carried out at temperatures below 30° C. and the pH is reduced and maintained at from 9 to 12, the common (red colored) free leuco is precipitated and on heating the resulting suspension to from 50° C. to 100° C., it is rearranged to the olive colored stable leuco derivative. Where the alkalinity of the solution is permitted to drop substantially below a pH of 9, the common red leuco may be precipitated, and care should be taken that this common leuco is not oxidized before the alkalinity of the suspension can be readjusted to a point where on heating the common red leuco is converted to the stable leuco derivative. While temperatures of from 55 to 90° C. have been given as preferred, it will be recognized that temperatures of 100° C. may be employed but with the resulting loss of hydrosulfite.

The resulting stable leuco derivatives exhibit properties entirely different from those of the known free leuco compounds of the parent ketonic vat dyestuff, since they are insoluble in cold or warm caustic alkali solutions and are relatively stable to oxidation in the presence of air and may be stored for long periods of time even when exposed to air. These leuco derivatives are generally precipitated in the form of olive colored, well-defined crystals as distinguished from the corresponding ordinary free leucos of this class which are red or brownish red, or the alkali metal salts which are blue in color. When in pure form they are free from sulfur and are not alkali metal containing compounds. They can be reconverted to the alkali metal salts of the common leuco when heated at the boil in strong caustic alkali or when heated at somewhat more moderate temperatures in the presence of certain organic nitrogen bases such as the ethanolamines, pyridine compounds, or with a small amount of an alkali metal hydrosulfite or other reducing agents, such as, glucose, "Rongalite" and metallic salts, such as, the ferrous and stannous salts. They are practically all insoluble in inert organic solvents, such as alcohol, benzene and nitrobenzene, and are soluble in pyridine with the characteristic bright red color of the leuco compounds of the ordinary alkoxydibenzanthrone leuco vat dyestuff into which they are converted by such solvent.

These stable reduction derivatives may be oxidized to the parent ketonic dyestuff in the very desirable crystalline form by means of oxidizing agents, such as, sodium hydrochlorite, chromic acid, hydrogen peroxide, alkali metal perborates, potassium permanganate, "Sitol" (nitrobenzene meta sulfonic acid sodium salt) and nitrobenzene. They may also be reoxidized back by air if the temperature of a suspension of the same is maintained sufficiently high. The nitrobenzene, nitrotoluene and similar oxidizing agents are apparently effective because of the slight solvent action which they have for the stable leuco derivatives at the elevated temperatures. In cases where assistant containing color pastes are desired as final products, the salt free aqueous highly concentrated stable leuco filter cake, as obtained by the process of co-pending application Serial No. 186,750 (now U. S. Patent 2,148,042), may be stirred or milled with exposure to air with a small amount of an alkaline reacting nitrogen base, such as, the ethanolamines, etc., which render the leuco derivatives less stable to oxidizing agents. The oxidation may be effected in neutral, alkaline or acid suspensions. However, where acids are employed, the concentration of the acid and the temperatures used must not be such that hydrolysis of the ether groups is effected.

*Example 1*

An amount of a technical filter press cake, equivalent to 100 parts of dry Bz-2,Bz-2'-dimethoxydibenzanthrone is suspended in 3500 parts of warm water containing 80 parts of sodium hydroxide in solution. After adjusting the temperature to 60° C., 100 parts of sodium hydrosulfite are added and the vat is stirred at 60 to 70° C. until the color is vatted completely. The vat may be filtered to remove any vat insoluble material, which may be present in the crude, technical color. 200 parts of technical sodium borate (borax) are then added to the vat at 60 to 65° C., and the vat is stirred at this temperature until the precipitation of the yellowish olive colored stable leuco derivative of Jade Green is completed, which usually requires from ½ to 1 hour of stirring, after the borax has been added. When the precipitation of the stable leuco compound is completed, 25 parts of nitrobenzene or 100 parts of technical "Sitol (nitrobenzene meta sulfonic acid sodium salt), are added and the suspension is heated to 95 to 100° C. for 1 hour or until the originally olive colored precipitate of the stable leuco derivative has changed in pigment color into the bright green color of pure dimethoxydibenzanthrone, indicating complete oxidation of the leuco back into the ketonic vat color. Microscopic examination of a drop of the color suspension, taken at this point, shows that the desirable (uniformly microcrystalline) physical form in which the stable leuco had originally been precipitated from the vat, is retained also in the final keto-vat dye suspension, in spite of this change in pigment color of the crystals and in spite of the chemical change involved in the oxidation from the stable leuco form into the ketonic vat color.

The precipitated dyestuff may be isolated by any of the known methods, for instance, by filtering the suspension and washing the filter cake free of water soluble salts. The cake, containing more than 20% color solids, may be converted into concentrated color pastes or printing powders by known methods. Due to their particularly microcrystalline physical form, these products are free from any tendency to coagulate in the printing gum and give exceptionally smooth and bright prints and strong pigment pad piece goods dyeings. This product shows a settling value of not over 5% when tested by the method outlined above.

In place of the technical borax which was used in this example, other salts, such as ammonium chloride, ammonium sulfate, aluminum sulfate, magnesium sulfate and sodium bicarbonate, or weak acids, such as phenol, acetic acid, boric acid and oxalic acid, which are capable of reducing the alkalinity of the vat to a pH value of from 9 to 12, may be used with equally good results.

In place of the nitrobenzene or "Sitol" used in this example as oxidizing agents, comparatively strong inorganic oxidizing agents, such as sodium hypochlorite, perborate, hydrogen peroxide in amounts up to two parts per one part of the dry color may be employed at temperatures from 60 to 100° C.

*Example 2*

25 parts (dry basis) of Bz-2,Bz-2'-dimethoxydibenzanthrone, as the technical filter press cake, are suspended in 875 parts of water containing 20 parts of sodium hydroxide in solution. The temperature is then adjusted to 30° C. and 25 parts of sodium hydrosulfite are added. The vat is stirred for 1 hour at 30 to 35° C. or longer, until the color is vatted completely. The vat is then cooled to 20 to 25° C. and 60 parts of technical borax are then added within a period of ½ hour. Stirring of the suspension is continued for another hour or until all color is precipitated in the form of the common amorphous (red colored and unstable) leuco acid.

The suspension is then heated slowly to finally 60 to 65° C. and kept at this temperature until the rearrangement of the unstable leuco acid into the olive colored, crystalline stable leuco derivative is completed.

25 parts of technical "Sitol" are now added and the suspension is heated to 95 to 100° C. until the stable leuco is oxidized completely to the ketonic vat color, obtained in the same microcrystalline form, as in Example 1.

Example 3

25 parts (dry equivalent) of a commercial "Ponsol" Jade Green paste is suspended in 600 parts of cold water, to which 215 parts of a 26% ammonia solution are added. 25 parts of sodium hydrosulfite are then added at room temperature and the suspension is slowly heated under agitation over a period of 1 hour to finally 70° C. At this temperature, reduction of the original (ketonic) color to the red (unstable) leuco acid in suspension occurs. Upon further heating for 1 hour or longer at finally 90° to 100° C., while allowing the excess ammonia to boil off from the suspension, transformation of the red leuco into the olive colored, crystalline stable leuco form takes place. When this reaction is completed, 50 parts of technical "Sitol" are added and the mass is further boiled for 1 hour or until the oxidation of the stable leuco back to the (ketonic) parent dyestuff, which is precipitated in the form of well-defined crystals, is completed. The product may then be filtered off and it is identical with the product of Example 1, except that the size of the crystals is slightly larger, due to the higher temperature and slower leuco formation employed in this example. In place of the ammonia used in this example, 25 parts of soda ash or potassium carbonate may be employed.

It is essential that the alkalinity of the solution be maintained at about 9 or above or the common red leuco in Examples 2 and 3 does not convert over to the stable reduction derivative even on prolonged heating.

Example 4

100 parts (dry equivalent) of technical Bz-2,-Bz-2'-dimethoxydibenzanthrone are suspended in 2000 parts of water containing 40 parts of caustic soda in solution. 100 parts of sodium hydrosulfite are added to the suspension at 50° C. and the mass is further stirred at 50 to 60° C. until practically all color is vatted. Upon further heating at 55 to 60° C., the olive colored stable leuco derivative of Jade Green precipitates out of solution in the form of well-defined crystals which are filtered off and washed free of inorganic salts.

The filter cake is then re-suspended in 1500 parts of cold water, containing 50 parts of hydrochloric acid (20° Bé.) in solution. 10 parts of sodium chlorate are then added and the suspension is heated at 50° C. until oxidation of the stable leuco to the ketonic crystalline parent vat color is completed, which may then be isolated as in the previous examples.

In place of the sodium chlorate and hydrochloric acid used in this example, chlorine gas may be introduced into the stable leuco suspension at 90 to 100° C., until the oxidation to the ketonic dyestuff is completed.

Example 5

100 parts (dry equivalent) of the isopropylation product of Bz-2,Bz-2'-dihydroxydibenzanthrone, the product of Example 3 of U. S. Patent 1,940,419 are suspended in 5700 parts of water, containing 80 parts of caustic soda in solution. The temperature is adjusted to 65° C. and 100 parts of sodium hydrosulfite are then added. The vat is stirred at 60 to 65° C. until all color is in solution and the vat may then be filtered, if desired, to remove any vat insoluble material which may be present. Enough sodium chloride is then added to bring the salt concentration to 10% sodium chloride and 200 parts of technical borax are added slowly, within ½ hour, while keeping the temperature of the vat at 65 to 70° C. After stirring at this temperature for another hour, the precipitation of the crystalline reduction product of the color is completed. 100 parts of technical "Sitol" are then added to the suspension, which is heated at 95 to 100° C. for 1 hour or longer until the oxidation of the leuco derivative to the parent vat color is completed. The crystalline precipitate, thus obtained, in which the crystals are somewhat larger than those in Example 1 is filtered off and the cake is washed free of water soluble salts. The cake may then be milled up with water to a color paste of 16 to 20% color solids, which does not coagulate in the conventional printing gum preparations and gives exceptionally strong and speck free prints. This product may show as high as 15% settling when measured by the test above given.

Example 6

20 parts (dry equivalent) of the purified bluish green vat dyestuff, obtained by condensing Bz-2,Bz-2'-dihydroxydibenzanthrone with 1,3-dibromopropane by the alkylation process described in Example 4 of U. S. Patent 1,950,366, are suspended in 700 parts of water, containing 20 parts of caustic soda in solution. The temperature is adjusted to 60° C. and 24 parts of sodium hydrosulfite are then added. The vat is stirred at 60 to 65° C. until all color is in solution. 60 parts of technical borax are then added and the mass is heated at 65 to 70° C. until the precipitation of the stable leuco derivative of the color, in the form of comparatively large crystals, is completed. 25 parts of technical "Sitol" are now added and the suspension is boiled for 1 hour or longer, until the stable leuco compound is oxidized back to the parent color in the ketonic, crystalline form. The color is isolated by filtration and may be converted into comparatively concentrated superior color pastes and printing powders by the usual methods.

Example 7

10 parts (dry equivalent) of the blue vat color, obtained by condensing 1,3-dichloro-2-butene with Bz-2,Bz-2'-dihydroxydibenzanthrone by the alkylation procedure described in Example 4 of U. S. Patent 1,950,366, are suspended in 1500 parts of warm water, containing 24 parts of sodium hydroxide in solution. 24 parts of technical sodium hydrosulfite are then added at 65° C. and the vat is stirred at 65 to 70° C. for ½ hour. 6 parts more sodium hydrosulfite and 30 parts of sodium bisulfite are stirred into the clear vat, which is then treated with a slow stream of carbon dioxide for 4 hours at 68 to 70° C., or until precipitation of the stable leuco derivative of the color in the form of olive colored, well-defined crystals with a bronzy luster is completed.

The suspension, thus obtained, is added slowly within 1½ hours into a boiling solution of 15 parts of technical "Sitol" in 150 parts of water. The heating of the mass is continued at 90 to 95° C. for another hour or until the oxidation of the stable leuco derivative to the ketonic parent dyestuff is completed. The crystalline precipitate may then be filtered off and converted into a 15% aqueous color paste, which gives very strong and speck free prints, when printed by the conventional vat color printing methods.

Example 8

50 parts (dry equivalent) of the purified blue vat dye, prepared by condensing Bz-2,Bz-2'-dihydroxydibenzanthrone with ethylene dibromide (Example 4 of U. S. Patent 1,950,366) are vatted under agitation for 1 hour at 65 to 70° C. with 60 parts of sodium hydroxide and 60 parts of sodium hydrosulfite in a dilution of 2500 parts of water. 15 parts more sodium hydrosulfite and 75 parts of sodium bisulfite are added to the vat, which is then heated at 70 to 75° C. for 4 hours or until all color is precipitated in the form of a microcrystalline, olive colored stable leuco derivative. The suspension is then heated to 80 to 100° C. and continuously air-blown at this temperature until finally the stable leuco derivative is oxidized back to the (ketonic) vat color. This usually requires 16 hours of air-blowing at 80 to 100° C. or at the boil, depending upon the purity of the parent vat color, and the particle size of the crystalline stable leuco derivative, which in turn varies somewhat with the speed of agitation and the temperature at which the vat is kept after reducing its alkalinity below a pH of 12 and the exposure of the vat to the surface air oxidation during the "stabilization" reaction at 70 to 75° C.

The crystalline (ketonic) vat color suspension, thus obtained, may be filtered off and the highly concentrated salt-free filter cake may be converted by known methods to comparatively concentrated color pastes, which give strong and speck free prints by the conventional vat dye printing methods.

Alternatively, the reoxidation of the isolated stable leuco derivative, as obtainable by filtering off the precipitate prior to the air-blowing of the suspension, or as obtained according to Example 7 of our co-pending application Serial No. 186,750 (now U. S. Patent 2,148,042), may be converted into a microcrystalline (ketonic) color paste, containing a printing assistant, by milling vigorously under air exposure the aqueous, concentrated filter cakes of the stable leuco together with certain printing assistants, which cause a reconversion of the stable leuco into the common leuco compound, such as for instance, the ethanolamines and others enumerated in U. S. application 186,750. Amounts of these printing assistants up to 20% of the final dyestuff paste may be used.

Example 9

20 parts (dry equivalent) of a 50% filter cake of the stable leuco derivative of Bz-2,Bz-2'-dimethoxydibenzanthrone, as obtained according to Examples 1 to 6 of co-pending application Serial No. 186,750 (now U. S. Patent 2,148,042), are suspended in enough water, containing 52 parts of a technical mixture of the mono-, di- and triethanolamines to give a total of 200 parts of a very fluid paste, which is milled vigorously under constant air exposure in a rotary iron mill for a total of 16 hours or longer, until all stable leuco has been oxidized to the parent (ketonic) vat dye particles in a desirable microcrystalline form.

Alternatively, the air oxidation of the stable leuco in the presence of the ethanolamines may be brought about by using less of the assistant and a much shorter oxidation time, when these stable leuco suspensions containing the ethanolamines, are heated to 70 to 100° C., while the mass is continuously stirred or milled under exposure to air oxygen.

The assistant containing vat color pastes obtained by either method, of 10 to 20% color solids, give very smooth and speck free prints, due to the microcrystalline form in which the (ketonic) dyestuff occurs, when made by this method.

Example 10

185 parts of a filter cake of the same stable leuco derivative as was also used in the previous example, equivalent to 100 parts of the dry color, are stirred into 300 parts of dextrin, dissolved or pasted up in 300 parts of water. The highly viscous mass, thus obtained, is milled in a heavy duty Werner and Pfleiderer mixer for a total of 4 to 8 hours, while heating the charge in the mixer at 40 to 60° C. and allowing the water to evaporate during the course of the milling. This evaporation and milling is continued, while exposing the charge constantly to air oxygen, until finally a practically dry residual mass is obtained, which is further dried at 100° C. and then pulverized. The dextrin powder, thus obtained, contains the color in a desirable microcrystalline ketonic form and gives speck free prints, when printed by conventional vat dye printing methods. If, on the other hand, the air is excluded in this process ( by milling the charge in a carbon dioxide or nitrogen atmosphere), a very stable dextrin powder is finally obtained, containing the color in the same microcrystalline stable leuco form, as was originally charged to the mixer, since in this case the dextrin acts as a stabilizer or protective colloid, protecting the stable leuco derivative against any subsequent air oxidation, when the powder is stored even for a prolonged time under ordinary atmospheric conditions.

I claim:

1. The process for preparing microcrystalline dye pastes and powders of the alkylation derivatives of Bz-2,Bz-2'-dihydroxydibenzanthrone which comprises converting a compound of the class consisting of the normal leuco compound of the color and its alkali metal salt to a stable reduction derivative by heating in solution or suspension at a temperature of from 55 to 100° C. while maintaining the alkalinity of the suspension or solution at a pH of from 9 to 12 and reoxidizing the precipitated stable reduction derivative to the parent ketonic form.

2. The process for preparing microcrystalline dye pastes and powders of the alkylation derivatives of Bz-2,Bz-2'-dihydroxydibenzanthrone which comprises adding an alkali metal salt, which is capable of reducing the alkalinity of a caustic soda solution, to an alkaline hydrosulfite vat of said dyestuffs in an amount sufficient to reduce the alkalinity of the vat to a pH of from 9 to 12, heating the solution at from 55 to 90° C. until precipitation of the olive colored stable reduction derivative is completed, and reoxidizing the olive colored stable reduction derivative to the parent ketonic dyestuff.

3. The process for preparing microcrystalline dye pastes and powders of the alkylation derivatives of Bz-2,Bz-2'-dihydroxydibenzanthrone which comprises adding borax to an alkaline hydrosulfite vat of said dyestuff in an amount sufficient to maintain the alkalinity of the vat at a pH of from 9 to 12, heating the same to from 55 to 90° C. until precipitation of the olive colored stable reduction derivative is completed and reoxidizing the olive colored stable reduction derivative to the parent ketonic dyestuff.

4. The process for preparing microcrystalline dye pastes and powders of the alkylation derivatives of Bz-2,Bz-2'-dihydroxydibenzanthrone which comprises adding borax to an alkaline hydrosulfite vat of said dyestuff in an amount sufficient to maintain the alkalinity of the vat at a pH of from 9 to 12 and heating the same to from 55 to 90° C. until precipitation of the olive colored stable reduction derivative is completed and reoxidizing the olive colored stable reduction derivative in the same solution in which it was formed to the parent ketonic dyestuff.

5. In the process for preparing microcrystalline dye pastes and powders of the alkylation derivatives of Bz-2,Bz-2'-dihydroxydibenzanthrone, the step which comprises oxidizing a suspension of the stable reduction derivatives of said alkylation products of Bz-2,Bz-2'-dihydroxydibenzanthrone to the parent ketonic dyestuff.

6. In the process for preparing microcrystalline dye pastes and powders of Bz-2,Bz-2'-dimethoxydibenzanthrone, the step which comprises oxidizing a suspension of the stable reduction derivative of said dimethoxydibenzanthrone to the parent ketonic dyestuff.

7. In the process for preparing microcrystalline dye pastes and powders of Bz-2,Bz-2'-dimethoxydibenzanthrone, the steps which comprise precipitating the stable reduction derivative from an alkaline hydrosulfite vat of the parent color by the addition of borax to said vat and reoxidizing the olive colored stable reduction derivative to the parent ketonic dyestuff.

8. In the process for preparing microcrystalline dye pastes and powders of Bz-2,Bz-2'-dimethoxydibenzanthrone, the steps which comprise precipitating the stable reduction derivative from an alkaline hydrosulfite vat of the parent color by the addition of borax to said vat and reoxidizing the olive colored stable reduction derivative in the same solution in which it was formed to the parent ketonic dyestuff.

9. A dye paste of an alkylation derivative of Bz-2,Bz-2'dihydroxydibenzanthrone in which the color particles of said dyestuff are in a uniformly fine microcrystalline form being extremely hard and rectangular in shape, said product being substantially identical with the product obtained by the process of claim 1.

10. A dye paste of Bz-2,Bz-2'-dimethoxydibenzanthrone in which the color particles of said dyestuff are in a uniformly fine microcrystalline form being extremely hard and rectangular in shape and so small that when made up as a 1% suspension in water without the aid of dispersing or suspending agents they show no more than 5% settling after 24 hours standing, and which do not coagulate when added in the form of an assistant free color paste of as high as 15% color solids to the conventional potassium carbonate printing paste preparations.

OTTO STALLMANN.